Dec. 1, 1925. 1,563,731
C. DUCAS
ELECTRICAL APPARATUS AND METHOD OF MANUFACTURING THE SAME
Filed March 2, 1925   6 Sheets-Sheet 1

Inventor
Charles Ducas.
By John B. Brady
Attorney

Dec. 1, 1925.
C. DUCAS
1,563,731
ELECTRICAL APPARATUS AND METHOD OF MANUFACTURING THE SAME
Filed March 2, 1925
6 Sheets-Sheet 2

Inventor
Charles Ducas.
By John B Brady
Attorney

Dec. 1, 1925.                                              1,563,731
C. DUCAS
ELECTRICAL APPARATUS AND METHOD OF MANUFACTURING THE SAME
Filed March 2, 1925          6 Sheets-Sheet 3

Inventor
Charles Ducas.

By John C. Brady
Attorney

Dec. 1, 1925.

C. DUCAS

1,563,731

ELECTRICAL APPARATUS AND METHOD OF MANUFACTURING THE SAME

Filed March 2, 1925       6 Sheets-Sheet 5

Inventor

Charles Ducas,

By John B. Brady

Attorney

Dec. 1, 1925.　　　　　　　　　　　　　　　1,563,731
C. DUCAS
ELECTRICAL APPARATUS AND METHOD OF MANUFACTURING THE SAME
Filed March 2, 1925　　　6 Sheets-Sheet 6

Inventor
Charles Ducas.

By John B. Brady
Attorney

Patented Dec. 1, 1925.

1,563,731

UNITED STATES PATENT OFFICE.

CHARLES DUCAS, OF NEW YORK, N. Y.

ELECTRICAL APPARATUS AND METHOD OF MANUFACTURING THE SAME.

Application filed March 2, 1925. Serial No. 12,651.

*To all whom it may concern:*

Be it known that I, CHARLES DUCAS, a citizen of the United States, residing at New York, in the county of New York and State of New York, have invented a certain new and useful Improvement in Electrical Apparatus and Methods of Manufacturing the Same, of which the following is a specification.

My invention relates broadly to the manufacture of electrical apparatus and more particularly to a method of reducing manufacturing costs in the production of coil windings and the circuit connections between various pieces of electrical apparatus comprising the complete apparatus.

One of the objects of the invention is to provide a method for decreasing factory costs in the production of coil windings and in the assembly of electrical apparatus where electric conductors are provided between the separate pieces of electrical apparatus forming the complete apparatus unit with a view of decreasing the ultimate cost of the apparatus to the consumer.

Another object of my invention is to provide an electrolytic process for use in the manufacture of coils and the arrangement of electrical circuits in which such coils are connected whereby manufacturing costs and production time may be considerably decreased.

Still another object of my invention is to provide a system for electro-plating the inductance windings and electrical circuit arrangements upon a supporting surface eliminating the necessity of winding individual strands of wires and assembling bus-bar connectors between separate pieces of apparatus.

Still another object of my invention is to provide a method of manufacturing electrical apparatus wherein the effective resistance of the conductors and electrical circuit connections in the apparatus may be considerably decreased over that now obtainable in electrical apparatus and circuits constructed in accordance with methods heretofore known.

A further object of the invention is to provide a system in which sets of tools, dies and templets may be originally constructed from which electrical circuits and inductances may be struck off by processes of printing, stenciling, painting or applications of decalcomania processes, whereby a film of conductive material may be deposited or exposed upon a surface over which a conductive layer having extremely low radio frequency resistance may be deposited in the formation of the electrical windings and circuits.

My invention relates to the series of steps which comprise the processes for the manufacture of the inductance windings and the arrangement of the electrical circuits as will be hereinafter described in more detail. I have illustrated my invention as particularly applicable in the manufacture of radio receiving apparatus, but it will be understood that the invention is applicable to the manufacture of other kinds of electrical apparatus and that limitations of the invention to the radio field are not intended.

My invention has been illustrated in the accompanying drawings, in which.

Heretofore in the manufacture of radio apparatus it has been necessary to provide automatic machines for winding inductances and coil units, which units had to be mounted independently on supporting panels and then carefully wired together by skilled mechanics. Wrong connections are readily made in the wiring process rendering the completed apparatus inoperative. The wiring of a modern radio receiver consumes a relatively large amount of time and it is imposssible to secure absolute uniformity in the wiring of receivers passing through a large production program. My present invention contemplates the manufacture of radio apparatus upon a large production scale inexpensively and by methods which ensure uniformity in the production of the receivers.

Reference will be made to the drawings in more detail in order to clearly describe my invention.

Figures 1, 2:
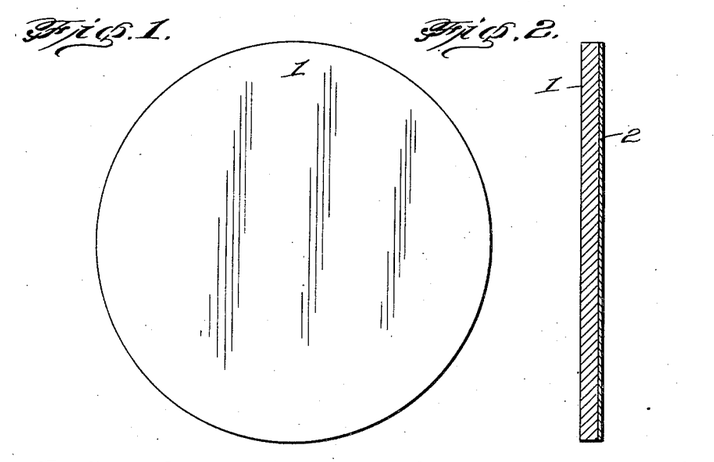
Figure 1 shows a blank made up of a low melting point conductive material which may be used in the process of manufacturing a flat spiral inductance.
Fig. 2 is a side view of the blank illustrated in Fig. 1 showing the surface thereof coated with a film of non-conductive material.
Figures 3, 4:
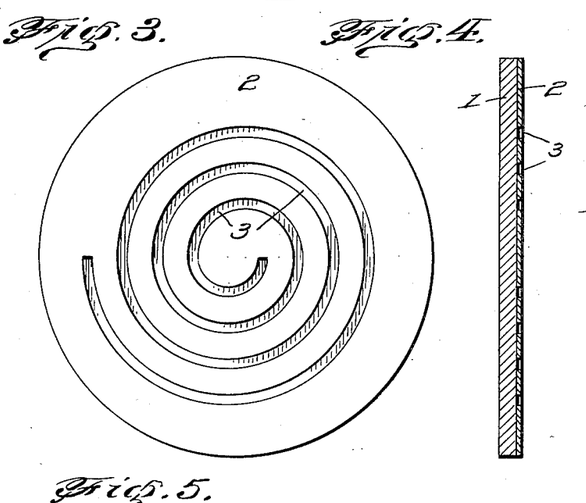
Fig. 3 is a view of the blank wherein a spiral groove has been cut through the film of non-conductive material exposing the surface of the conducting material in the groove.
Fig. 4 is a cross sectional view of the blank illustrated in Fig 3.
Figure 5:
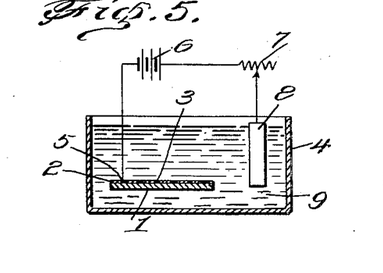
Fig. 5 is a diagrammatic view of the electro-plating process in which a spiral conductor of extremely low radio frequency resistance such as silver, copper or gold, is electrolytically deposited within the spiral groove of the blank illustrated in Fig. 4.
Figure 6:
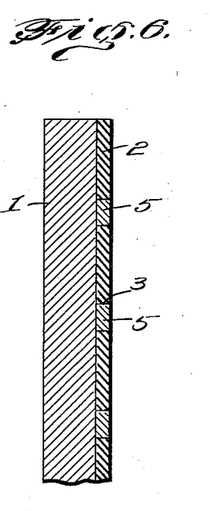
Fig. 6 is an enlarged cross sectional view of the blank after it is removed from the bath and showing the electrolytically deposited metal forming the spiral turns of the inductance.
Figure 7:
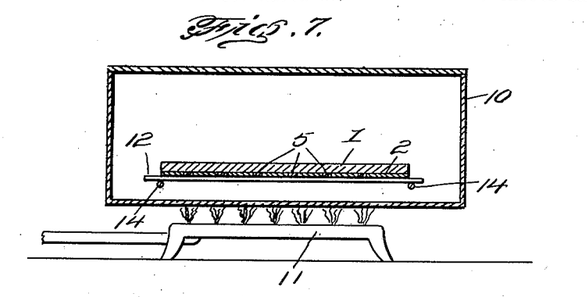
Fig. 7 is a diagrammatic view illustrating the step by which the non-conductive material and conductive material of low melting point may be removed from the electrolytically formed spiral inductance.
Figure 8:
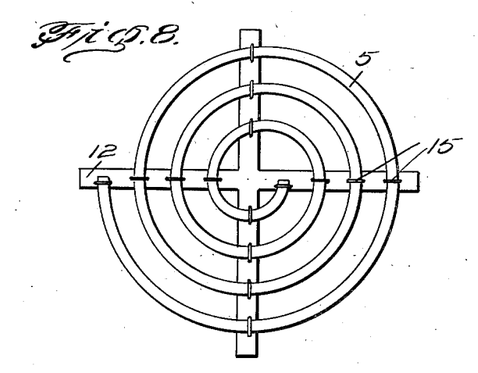
Figs. 8 and 9 are views of the completed inductance formed by the electrolytic process.
Figure 9:
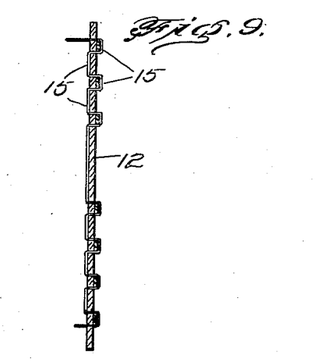
Figures 10, 11, 12, 13:
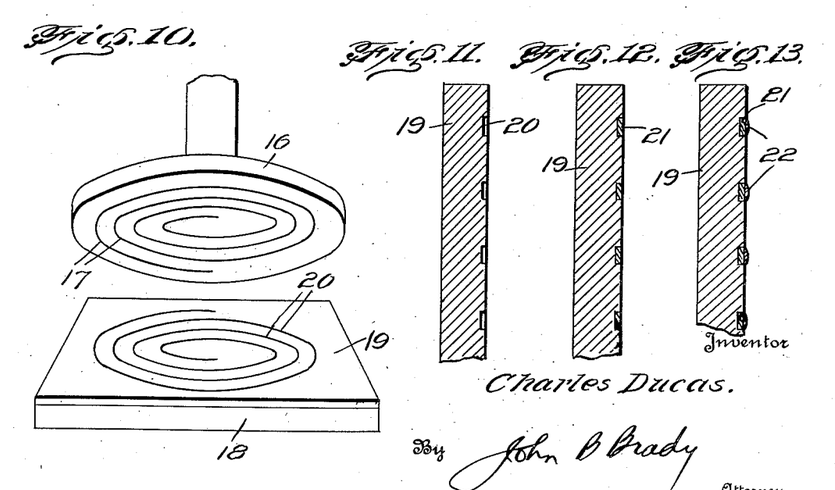
Fig. 10 is a diagrammatic view illustrating a method of die-pressing the grooves in which a spiral inductance may be electrolytically deposited in accordance with steps illustrated in Figs. 11, 12 and 13.

Reference character 1 designates a blank of relatively low melting point conductive material, such as a metal which melts at 250° F., over which is coated a film 2 of non-conductive material. For purposes of illustration the film has been represented in cross section only upon the face of the blank, but it will be understood that the film forms a protective coating over the entire blank. The blank is placed in a turning lathe and a spiral groove 3 cut through the film 2 exposing the conductive material of the blank 1. The blank may be placed in the tank containing electrolyte 9 and electro-plated. An anode 8 which may be composed of silver, copper or gold, or other metal having a characteristically low radio frequency resistance is immersed in the bath and connected with a source of energy 6 and control rheostat 7, the circuit being completed to the conductive spiral groove 3 as indicated at 5. Metal will be electrolytically deposited in the spiral groove 3 as indicated at 5, shown more clearly in Fig. 6, forming a spiral inductance. The remaining film of conductive material 2 may now be scraped off or otherwise removed. The blank 1 having the spiral inductance deposited on the surface thereof is then placed in an oven 10 or other suitable heating means where just sufficient temperature is supplied, as indicated at 11, to cause the blank 1 to melt away completely from the electro-plated spiral 5. For this purpose an insulated frame 12 is supported in the oven on transverse members 14 against which the spiral inductance 5 rests when the low melting point blank 1 melts away. Provision is made for saving the melted alloy from the blank 1 so that it may be re-used in the preparation of subsequent blanks, thereby decreasing expense and avoiding waste. There remains in the oven the self-supporting spiral 5. The spirals having the desired inductance values may be mounted in pairs or groups with the thin insulation strips forming the frame 12 as spacing members, the turns being secured to the strips 12 in any desired manner as illustrated at 15 in Figs. 8 and 9 of the drawings. The inductance may also be constructed by forming an impression in a layer of non-conductive material having a relatively low melting point such as compounds of beeswax, or resinous gums, which I have indicated at 19 as supported on surface 18 in Fig. 10. A spiral impression 20 may be made in the wax material in various ways. I have represented a die 16 having a raised spiral cutting face 17 thereon which will cut an impression in the relatively soft material 19. A plastic conductive material can then be rubbed into the spiral groove 20 as represented at 21 in Fig. 12. The plate may then be immersed in the electro-plating bath and low resistance metal electrolytically deposited upon the conductive material 21 as represented at 22 in Fig. 13. The wax blank 19 may then be melted away as heretofore described leaving the self-supporting coil 22.

Figure 14:
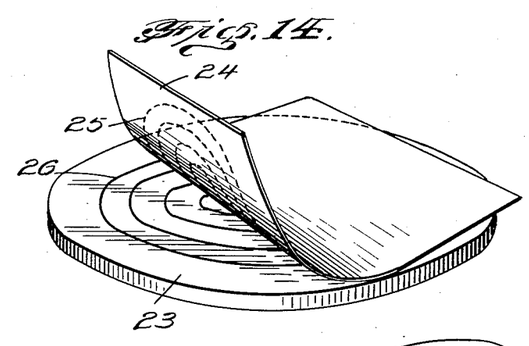
Fig. 14 is a diagrammatic view illustrating a method of depositing an inductance design upon a transfer disk by a decalcomania process.

In Fig. 14 a spiral design 25 is represented as contained upon a decalcomania 24 in the form of a conductive paste which may be transferred to the blank 23, as represented at 26, which blank is electrolytically treated as heretofore described.

Figure 15:
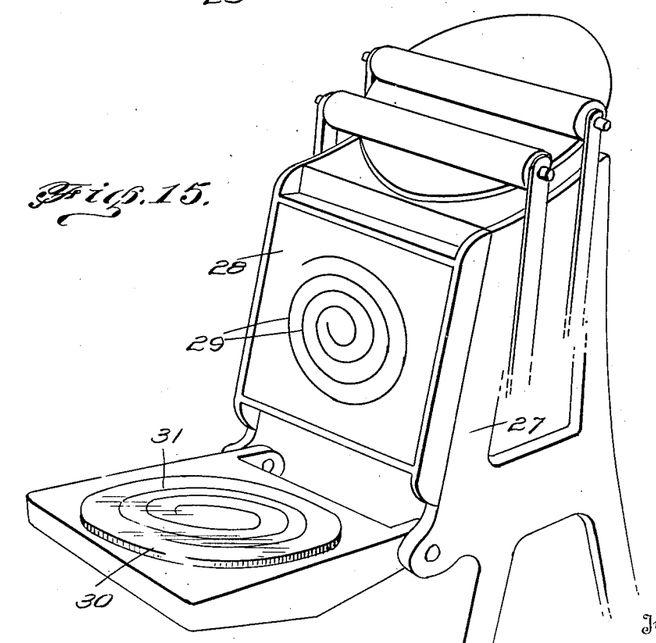
Fig. 15 illustrates a method of printing a design of flat spiral inductance upon a supporting disk preparatory to electrolytically depositing low radio frequency resistance metal thereon.

The process may be carried out as represented in Fig. 15 where a printing device 29 upon a matrix 28 is employed to print a spiral 31 in conductive paste on the blank 30, after which the blank 30 may be subjected to an electrolytic bath as heretofore described.

Figures 16, 17:
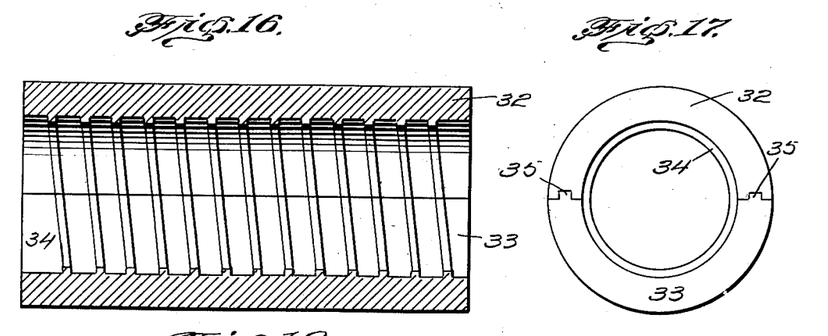
Figs. 16, 17 and 18 illustrate the application of my invention to tubular shaped inductances.
Figure 18:
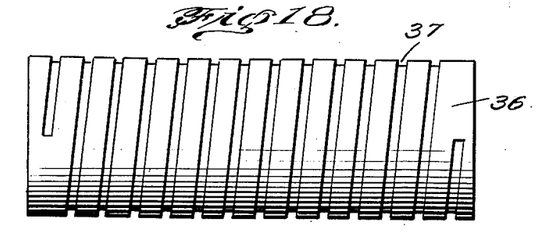
Figure 19:
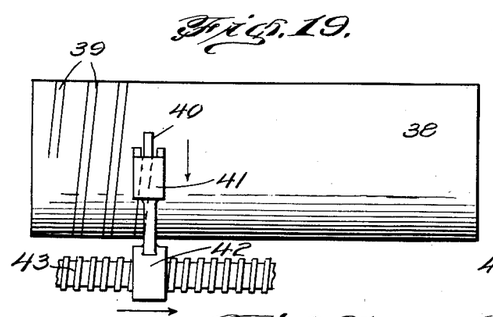
Figs. 19, 20, 21 and 22 show other methods of forming tubular shaped inductances.
Figure 20:
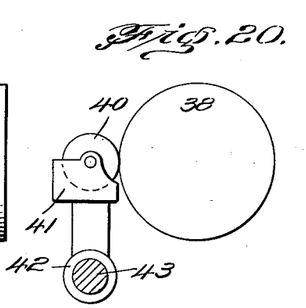

It will be understood that the processes hereinbefore described for the manufacture of flat spiral inductances can be used, with slight modifications, in the manufacture of cylindrical inductances and in placing electrical circuits upon a panel.

Where a particular electrical apparatus requires a large quantity of cylindrical coils of a given size, a die may be constructed in accordance with the design illustrated in Fig. 16. The die is formed in two parts indicated at 32 and 33 fitting together as represented in Fig. 17 along horizontal joints 35. Projecting spirals 34 are formed in the inner surface of each of the die sections. For purposes of illustration the pitch of the spiral threads formed by the raised portions 34 has been considerably exaggerated and it will be understood that these may be formed closely together in the order of distances normally employed in engraving processes. The die is used as a mold into which a wax form 36 is poured. When the wax 36 hardens the mold is removed leaving the wax form with a continuous spiral groove 37 into which the conductive material is rubbed and the process continued as aforesaid.

Figures 21, 22:
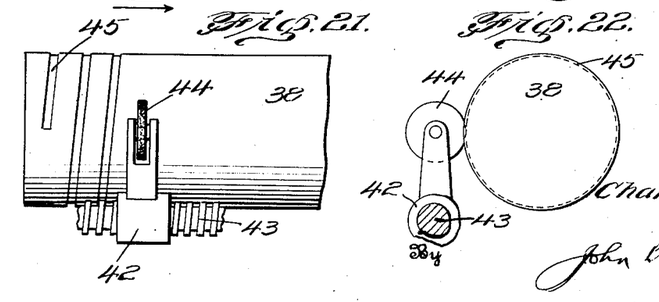

The process may also be directly applied to an insulated cylinder 38 on which a conductive paste 39 may be deposited in spiral formation by means of a rotary distributing wheel 40 which conveys the conductive paste from a fountain 41 which is advanced axially with reference to the cylinder 38 by suitable means such as screw 43 and carriage 42. The screw 43 may be provided with a pitch so fine that the conductive paste is distributed along the tubular support 38 with just sufficient separation between the turns to prevent short circuit after the conclusion of the electrolytic process. The insulated cylinder 38 may also be prepared as represented in Figs. 21 and 22 by grinding, milling or cutting a groove 45 in the cylinder by means of a rotary cutter 44 driven axially with respect to the cylinder 38 simultaneously with the rotation thereof. The grinding depth is extremely slight but sufficient to permit the conductive paste to be rubbed into the cylinder and then the cylinder electro-plated forming the inductance.

Figure 23:
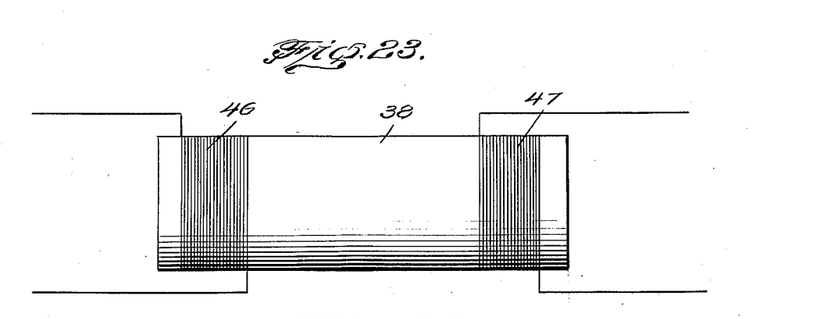
Figs. 23 and 24 illustrate the applications of inductances formed in accordance with the process of my invention.
Figure 24:
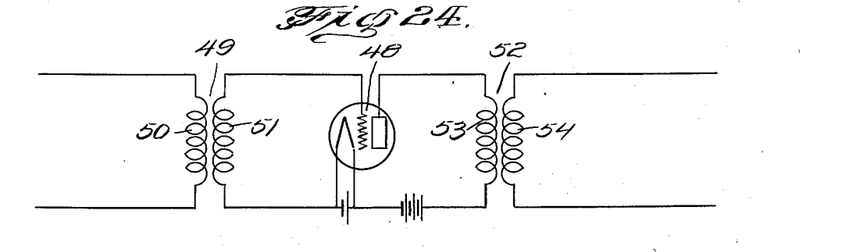

One of the applications of my invention is clearly shown in Figs. 23 and 24 where the completed inductances 46 and 47 on the coil support 38 form primary and secondary windings of a transformer. Inductances of this kind are particularly desirable in electron tube circuits where the tube 48 has its input and output circuits connected with inductances formed in accordance with this invention. I have represented diagrammatically a transformer 49 having a primary winding 50 and secondary winding 51 which connects to the input circuit of the electron tube 48. A transformer 52 is provided having primary winding 53 connected in the plate circuit of the tube 48 with a secondary winding 54 inductively associated therewith. The fact that the radio frequency resistance of these windings is extremely slight by reason of the high conductivity of the electrolytically deposited metal enables me to obtain a high degree of efficiency in the electron tube circuits.

Figure 25:
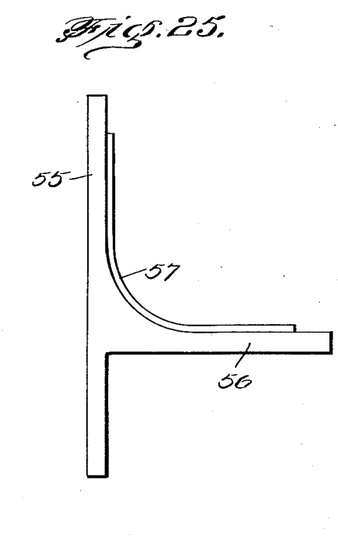
Figs. 25 and 26 show methods of electro-plating connections from horizontal to vertical panels on which electrical apparatus may be mounted and connected together through the electrolytically deposited metal.
Figure 26:
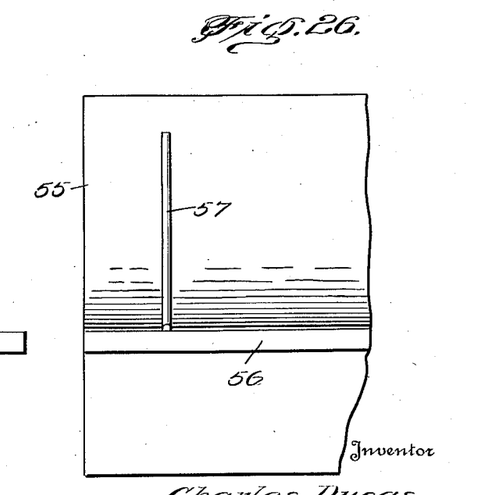
Figure 27:
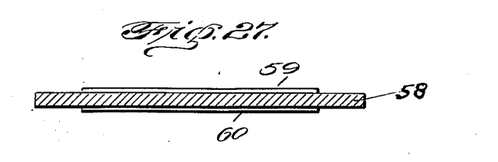
Fig. 27 is a cross sectional view of a panel on which independent electro-plated connections may be provided on opposite sides thereof, electrically insulated from each other.
Figure 28:
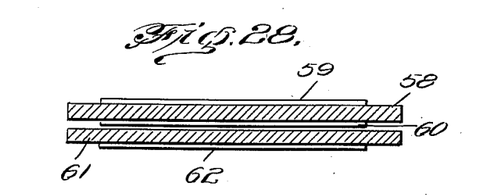
Fig. 28 shows an arrangement of two or more plates which may be positioned adjacent each other and several sets of circuits thereby obtained.
Figure 29:
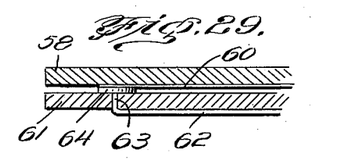
Fig. 29 is a cross sectional view showing a method which may be employed for connecting the the circuits which are disposed in different planes.

In order to facilitate the construction of electrical apparatus electrolytic deposits may be made directly upon the insulated panels of the apparatus. Figures 25 and 26 represent a conductor 57 which has been electro-plated upon vertical panel 55 and horizontal panel 56. Apparatus may be mounted directly upon the panels 55 and 56 having their terminals arranged to contact with the conductor 57 in the nature of a bus bar. Where conductors are mounted upon panels the high tension leads may be separated from low tension leads by an intervening panel as has been represented at 58 in Fig. 27, separating the conductors 59 and 60. The conductors 59 and 60 are electrolytically deposited on opposite sides of the panel 58. Two or more panels may be positioned adjacent each other with three sets of circuits constructed thereby as represented in Fig. 28 where panels 58 and 61 have conductors 59, 60 and 62 electrolytically deposited thereon. Figure 29 shows a method which may be employed for interconnecting the circuits in different planes. The electroplated metal forming conductor 62 extends through an aperture in panel 61 as represented at 63 terminating in an extended connecting surface 64 which in turn contacts with conductor 60 on panel 58.

Figure 30:
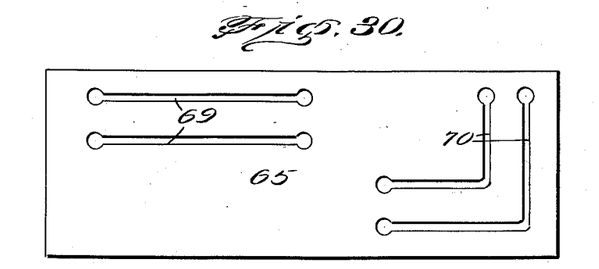
Figs. 30 and 31 show a panel and templet arranged for the laying out of electrical circuits preparatory to the electrolytic disposition of metal on the panel, through the openings formed in the templet, for the interconnection of apparatus mounted on the panel.
Figure 31:
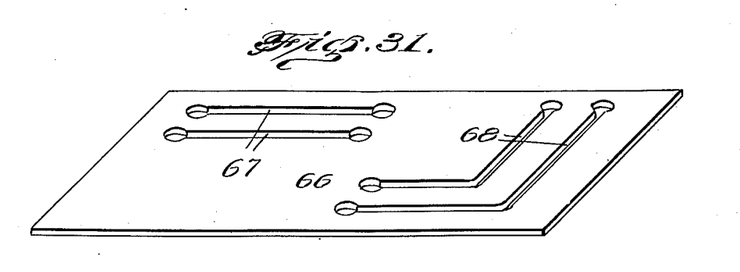

Figure 30 represents a panel 65 on which has been electrolytically deposited the connections 69 and 70. These are formed by employing the templet illustrated in Figure 31 consisting of a plate 66, apertured at 67 and 68. The templet 66 is placed over the panel 65 and conductive paste rubbed upon the panel through the apertures. The panel 65 may be electrolytically treated for the disposition of metal thereon. In this way the separate pieces of apparatus may be mounted on the panel at opposite ends of the electro-plated conductors for interconnecting the apparatus, making it unnecessary to wire the instruments together inasmuch as the terminals of the instruments contact with the conductors formed on the panel.

By employing the principles herein set forth I am enabled to manufacture inductances and electrical circuits for electrical apparatus which greatly facilitates the quantity production of complicated electrical instruments. The process of simultaneously electro-plating circuit connections upon an instrument panel makes it a simple matter to train unskilled labor in the assembly of instruments where it is only necessary to move the instruments into position with the terminals thereof in contact with the electro-plated conductors on the panel and then securely fasten the instruments to the panel by suitable mechanical means.

It will be understood that while I have described my invention in certain limited embodiments I desire to place no limitations upon the invention other than those imposed by the scope of the appended claims.

What I claim and desire to secure by Letters Patent of the United States is as follows:

1. A method of manufacturing electrical apparatus which consists in initially preparing an electrically conductive path upon a supporting surface, subjecting said path to an electroplating bath in which said path comprises the cathode, electrolytically depositing a metal having a low radio frequency resistance upon said path, and removing the conductor thus formed from said bath.

2. A method of manufacturing electrical apparatus which consists in initially preparing an electrically conductive path upon a supporting surface, subjecting said path to an electroplating bath in which said path comprises the cathode, electrolytically depositing a metal having a low radio frequency resistance upon said path, removing the conductor thus formed from said bath, dissolving away said supporting surface and mounting the conductor thus formed upon an insulated frame.

3. A method of manufacturing electrical apparatus which consists in initially preparing an electrically conductive path upon a supporting surface, subjecting said path to an electroplating bath in which said path comprises the cathode, electrolytically depositing a metal having a low radio frequency resistance upon said path, removing the conductor thus formed from said bath, separating said conductor from said supporting surface, and insulatingly supporting said conductor for connection in an electrical circuit.

4. A spiral electrical conductor comprising in combination a spiral base of conductive material and an electrolytically deposited spiral coating on said base of low radio frequency resistance.

5. An electrical conductor consisting of an extended circuitous path in the form of a wire having its greatest dimension in a longitudinal direction, and a coating of electrolytically deposited metal over said path, said coating having a low resistivity to radio frequency currents.

6. The method of manufacturing electrical apparatus which consists in painting a layer of conductive material upon a supporting surface in the form of a circuitous path resembling a wire electroplating a metal having low radio frequency resistance upon said material, and providing a permanent mounting for the electroplated conductor thus formed.

7. The method of manufacturing electrical apparatus which consists in printing a conductive layer of material upon a supporting surface in the form of an electrical circuit, and electroplating a metal having low radio frequency resistance upon the printed layer for forming an electrical circuit of low radio frequency resistivity.

8. A spiral electrical inductance comprising a layer of conductive material, and an electrolytically deposited film of metal thereover having low resistance to radio frequency currents.

9. A method of constructing electrical apparatus which consists in marking out circuitous paths upon a supporting surface, placing a conductive material over the paths and electroplating the conductive material with a metal having low resistance to radio frequency currents.

10. Apparatus for constructing electrical circuits arranged for the mounting of instruments upon panels comprising in combination with panel surfaces, templets corresponding in shape to said surfaces having circuitous apertures therein arranged according to the mounting of instruments upon said panel surfaces, whereby coatings of conductive material may be applied to said panel surfaces through said apertures with said templets positioned directly adjacent said panel surfaces, means for electrolytically depositing a metallic film of low radio frequency resistance upon said coatings, whereby circuits may be formed directly upon said panel surfaces for interconnecting terminals of electrical instruments secured to said surfaces.

11. The method of manufacturing electrical inductances which consists in forming a circuitous impression in a readily dissolvable material, rubbing a conductive paste into the impression thus formed, subjecting the conductive paste circuitous path to an electrolytic process forming a deposit of metal upon said path. removing the metal thus deposited and mounting the inductance thus formed upon an insulated support.

CHARLES DUCAS.